US010332643B2

(12) United States Patent
Holcomb et al.

(10) Patent No.: US 10,332,643 B2
(45) Date of Patent: Jun. 25, 2019

(54) APPARATUS AND METHOD FOR STRIPPING TRITIUM FROM MOLTEN SALT (71) Applicant: UT-Battelle, LLC, Oak Ridge, TN (US)

(72) Inventors: David E. Holcomb, Oak Ridge, TN (US); Dane F. Wilson, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 157 days.

(21) Appl. No.: 15/383,091

(22) Filed: Dec. 19, 2016

(65) Prior Publication Data

US 2017/0213609 A1 Jul. 27, 2017

Related U.S. Application Data (62) Division of application No. 14/333,627, filed on Jul. 17, 2014, now Pat. No. 9,564,251.

(51) Int. Cl.
G21C 19/307 (2006.01)
G21C 3/54 (2006.01)
G21G 1/00 (2006.01)
G21F 9/06 (2006.01)

(52) U.S. Cl.
CPC ............ G21C 19/307 (2013.01); G21C 3/54 (2013.01); *G21F 9/06* (2013.01); *G21G 1/001* (2013.01); *G21G 2001/0094* (2013.01)

(58) Field of Classification Search
CPC ......... G21C 19/30; G21C 19/307; G21C 3/54
See application file for complete search history.

(56) References Cited

U.S. PATENT DOCUMENTS

| 3,037,922 | A | | 6/1962 | Johnson | |
|---|---|---|---|---|---|
| 3,302,701 | A | | 2/1967 | Thomas | |
| 3,957,597 | A | | 5/1976 | Maroni | |
| 3,993,542 | A | * | 11/1976 | Blum | F28F 21/02 376/311 |
| 6,761,755 | B2 | * | 7/2004 | Jantsch | B01D 53/228 55/524 |
| 6,899,744 | B2 | | 5/2005 | Mundschau | |
| 7,700,184 | B2 | | 4/2010 | Harold et al. | |

(Continued)

OTHER PUBLICATIONS

Stempien, J. D. "A Performance Assessment of 316 Stainless Steel in the Fluoride Salt-Cooled high-Temperature Reactor" Modern Physical Metallurgy, MIT, Fall 2012. (Year: 2012).*

(Continued)

*Primary Examiner* — Sharon M Davis
(74) *Attorney, Agent, or Firm* — Warner Norcross + Judd LLP (57) ABSTRACT

A method of stripping tritium from flowing stream of molten salt includes providing a tritium-separating membrane structure having a porous support, a nanoporous structural metal-ion diffusion barrier layer, and a gas-tight, nonporous palladium-bearing separative layer, directing the flowing stream of molten salt into contact with the palladium-bearing layer so that tritium contained within the molten salt is transported through the tritium-separating membrane structure, and contacting a sweep gas with the porous support for collecting the tritium.

9 Claims, 5 Drawing Sheets

(56) References Cited

U.S. PATENT DOCUMENTS

| | | | |
|---|---|---|---|
| 8,052,775 | B2 | 11/2011 | Hou et al. |
| 8,182,590 | B2 | 5/2012 | Striemer et al. |
| 2009/0130477 | A1 | 5/2009 | Hou et al. |
| 2009/0134039 | A1 | 5/2009 | Matthews |
| 2013/0083878 | A1 | 4/2013 | Massie et al. |
| 2014/0226775 | A1 | 8/2014 | Devolpi |
| 2015/0228363 | A1 | 8/2015 | Dewan et al. |

OTHER PUBLICATIONS

M. F. Simpson, et al., "Quantitative Measurement of Beryllium-Controlled Redox of Hydrogen Fluoride in Molten Flibe," Fusion Engineering and Design, 2006, pp. 541-547, vol. 81.

Y. S. Cheng and K. L. Yeung, "Palladium-Silver Composite Membranes by Electroless Plating Technique," Journal of Membrane Science, 1999, pp. 127-141, vol. 158.

G. T. Mays, et al., "Distribution and Behavior of Tritium in the Coolant-Salt Technology Facility," Oak Ridge National Laboratory, 1977, pp. 1-69, ORNL/TM-5759.

W. F. Calaway, "Electrochemical Extraction of Hydrogen From Molten LiF—LiCl—LiBr and its Application to Liquid-Lithium Fusion Reactor Blanket Processing," Nuclear Technology, 1978, pp. 63-74, vol. 39.

G. I. Eskin, "Cavitation Mechanism of Ultrasonic Melt Degassing," Ultrasonic Sonochemistry, 1995, pp. S137-S141, vol. 2, No. 2.

D. A. Petti, "Jupiter-II Molten Salt Flibe Research: An Update on Tritium, Mobilization and Redox Chemistry Experiments," Fusion Engineering and Design, 2006, pp. 1439-1449, vol. 81.

Satoshi Fukada, "Flibe-Tritium Research for Fission or Fusion Reactors at Kyushu University," J. Plasma Fusion Res. Series, 2013, pp. 22-26, vol. 10.

V. Jayaraman and Y.S. Lin, "Synthesis and Hydrogen Permeation Properties of Ultrathin Palladium-Silver Alloy Membranes," Journal of Membrane Science, 1995, pp. 251-262, vol. 104.

P. P. Mardilovich, et al., "Defect-Free Palladium Membranes on Porous Stainless-Steel Support," AIChE Journal, 1998, pp. 310-322, vol. 44, No. 2.

M. W. Rosenthal, et al., Molten-Salt Reactor Program Semiannual Progress Report for Period Ending Feb. 28, 1970, 1970, pp. 1-364, ORNl-4548.

E. L. Compere, et al., "Fission Product Behavior in the Molten Salt Reactor Experiment," Oak Ridge National Laboratory, 1975, ORNL-4865.

M. D. Shapiro and C. M. Reed, "Removal of Tritium from the Molten Salt Breeder Reactor Fuel," Oak Ridge National Laboratory, 1970, pp. 1-33, ORNL-MIT-117.

J. B. Talbot, "A Study of Tritium Removal from Fusion Reactor Blankets of Molten Salt and Lithium-Aluminum," 1976, Oak Ridge National Laboratory, pp. 1-95, ORNL/TM-5104.

G. R. Longhurst, et al., "Tritium Loss in Moltent Flibe Systems," Fusion Technology, 2000, pp. 376-383, vol. 38.

U.S. Atomic Energy Commission, "An Evaluation of the Molten Salt Breeder Reactor", 1972, pp. 1-66, WASH-1222.

Ke Zhang, et al., "High-Temperature Stability of Palladium Membranes on Porous Metal Supports with Different Intermediate Layers," Ind. Eng. Chem. Res., 2009, pp. 1880-1886, vol. 48.

J.S. Watson, "An Evaluation of Methods for Recovering Tritium from the Blankets or Coolant Systems of Fusion Reactors," Oak Ridge National Laboratory, 1972, pp. 1-53, ORNL-TM-3794.

\* cited by examiner

APPARATUS AND METHOD FOR STRIPPING TRITIUM FROM MOLTEN SALT

CROSS REFERENCE TO RELATED APPLICATION

This application is a divisional application of U.S. patent application Ser. No. 14/333,627 filed on Jul. 17, 2014, which is incorporated herein in its entirety by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

Tritium release from FLiBe is a significant safety issue in Molten Salt Reactors (MSRs) including both Fluoride Salt-Cooled High-Temperature Reactors (FHRs) and dissolved fuel MSRs, and fusion reactors. Tritium is formed in FLiBe through neutron interactions with both lithium and beryllium. The tritium generally either exists in the salt as tritium fluoride (TF), a dissolved ion ($T^+$), or as dissolved tritium gas (HT or $T_2$). Shifting the redox potential of the fluoride salt to a more reducing condition shifts the chemical equilibrium away from tritium-fluoride. Metallic beryllium contact has been shown to effectively reduce TF to $T^+$ in FLiBe. Excess beryllium in the salt will keep the FLiBe TF concentration below 20 ppt. Tritium gas has a very low solubility in FLiBe. The equilibrium partial pressure of tritium gas over FLiBe with 1 ppm $T_2$ is $10^5$ Pa.

The tritium will transport along with the salt. The generated tritium can be trapped by the carbonaceous materials in the primary loop, escape through the primary coolant surface into the cover gas, permeate through the reactor vessel or piping, or permeate through the heat exchanger tubing. The large surface area and thin tubing walls combined with the turbulent mixing within the heat exchanger makes tritium escape through the heat exchanger tubes a significant tritium escape mechanism. Tritium has been calculated and experimentally demonstrated at the Molten Salt Reactor Experiment (MSRE) at the Oak Ridge National Laboratory to significantly transfer from FLiBe under turbulent flow through heat exchanger tubes.

The calculated tritium production rate at the MSRE was 54 Ci/day, and the observed disposition of tritium, not including retention in the off-gas system, amounted to 80% of this production rate: 48% discharging from fuel off-gas system, 2% discharging from coolant off-gas system, 7% discharging in coolant radiator air, 9% appearing in cell atmosphere, and 14% going into the core graphite. Most of the remainder was probably held up in oil residues in the fuel off-gas systems. Further information and attribution can be found in the references listed at the end of the specification.

Tritium can be a hazardous radioactive contaminant under the above described and other conditions, but if it can be sequestered, tritium would be a valuable commodity, being useful for various applications, particularly as the parent isotope for $^3$He for which there is currently a global shortage. There has been heretofore a need for an effective and practical mechanism to strip tritium from FLiBe that is used in nuclear power plants.

BRIEF SUMMARY OF THE INVENTION

In accordance with one aspect of the present invention, the foregoing and other objects are achieved by a nuclear reactor system including a nuclear reactor, a utilization means for utilizing heat energy generated by the nuclear reactor, and a flowing stream of molten salt for transferring the heat energy from the nuclear reactor to the utilization means, wherein the improvement includes a tritium-separating membrane structure having a porous support, a nanoporous structural metal-ion diffusion barrier layer, and a gas-tight, nonporous palladium-bearing separative layer, means for directing the flowing stream of molten salt into contact with the palladium-bearing layer so that tritium contained within the molten salt is transported through the tritium-separating membrane structure, and means for contacting a sweep gas with the porous support for collecting the tritium.

In accordance with another aspect of the present invention, a method of stripping tritium from a flowing stream of molten salt includes providing a tritium-separating membrane structure having a porous support, a nanoporous structural metal-ion diffusion barrier layer, and a gas-tight, nonporous palladium-bearing separative layer; directing the flowing stream of molten salt into contact with the palladium-bearing layer so that tritium contained within the molten salt is transported through the tritium-separating membrane structure; and contacting a sweep gas with the porous support for collecting the tritium.

Functionally like components are identified with the same callout numerals throughout the figures in order to show how the components interrelate in various configurations.

For a better understanding of the present invention, together with other and further objects, advantages and capabilities thereof, reference is made to the following disclosure and appended claims in connection with the above-described drawings.

DETAILED DESCRIPTION OF THE INVENTION

Palladium and palladium-silver alloy films are commercially used as gaseous hydrogen separation membranes. Palladium has very high affinity for disassociating molecular hydrogen (and therefore tritium) into the atomic state, enabling fast absorption and desorption. Palladium can absorb large amounts of tritium while maintaining its physical properties, and has a high tritium transport (diffusion) rate.

In order to apply the above principle to tritium-contaminated salt, especially FLiBe, a tritium-stripping transport membrane structure has been devised wherein molten salt turbulently flows on one side of the membrane structure, and a sweep gas flows on the other side thereof, neither able to pass through the membrane structure. Tritium, however, is transported through the membrane structure, effectively transferring from the salt into the sweep gas, which can generally comprise any gas that does not contain unbound hydrogen and is chemically compatible with the membrane structure. Examples of sweep gases can include, for example, dry air, nitrogen, helium, argon, and a combination of any of the foregoing. The apparatus and method disclosed herein thus mitigate tritium contamination in the salt, sequestering the tritium in the sweep gas, from which it can be easily concentrated and utilized in applications such as those described hereinabove.

Figure 1:
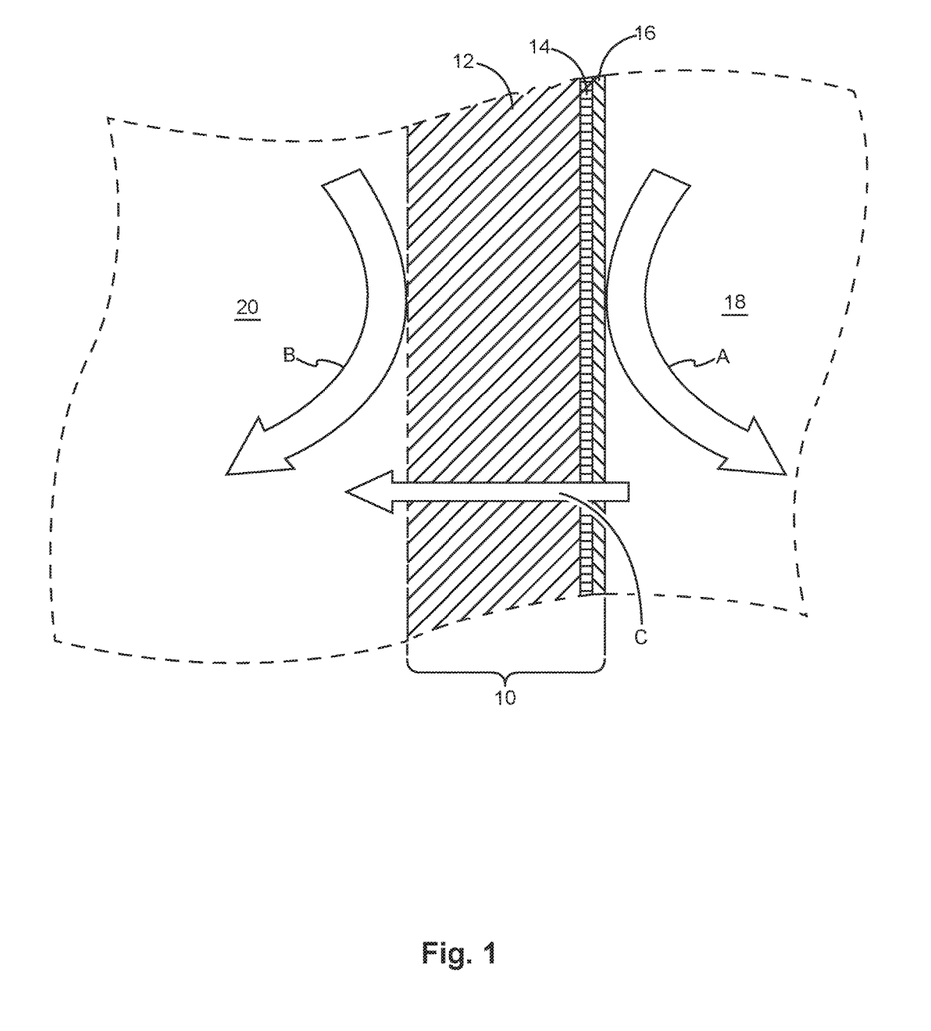
FIG. 1 is a schematic diagram showing a tritium-stripping membrane in accordance with the present invention.

Referring to FIG. 1 a layered, tritium-separating membrane structure 10 (henceforth called membrane structure) can be comprised of a porous support 12 (henceforth called support), a nanoporous structural metal-ion diffusion barrier layer 14 (henceforth called barrier layer), and a gas-tight, nonporous palladium-bearing separative layer 16 (henceforth called separative layer). The layers 12, 14, 16 that make up the membrane structure 10 should have compatible thermal expansion characteristics and also should be respectively compatible with the molten salt 18 and sweep gas 20, the flows of which are shown by respective arrows A and B.

FIG. 1 shows only a small portion of the membrane structure 10 in order to illustrate the layers. The membrane structure 10 can be made in any suitable shape and configuration, such as a tube or a plate, for example.

The support 12 can comprise a sintered or fritted metal, ceramic, or cermet material, limited only by mechanical strength and compatibility to process fluids and other components of the membrane structure 10. An important aspect of the support 12 is the ability to join it to upstream and downstream piping. Using a similar alloy as that of the piping can significantly decrease the difficulty of creating a compatible joint. While alumina or other ceramics can be formed into suitable structural supports, ceramics are much more difficult to effectively join to the piping.

Suitable materials for the support 12 can include any alloy typically used in nuclear applications; some examples include, but are not limited to 316 stainless steel (also known as SS316), 304L stainless steel, 310 stainless steel, 347 stainless steel, 430 stainless steel, Hastelloy® B, Hastelloy® B-2, Hastelloy® C-22, Hastelloy® C276, Hastelloy® N, Hastelloy® X, Inconel® 600, Inconel® 625, Inconel® 690, Monel® 400, Nickel 200, Alloy 20, titanium, other stainless steel compositions, nickel-based alloys, and the like. (Hastelloy® trademark is owned by Haynes International, Inc. Monel® and Inconel® trademarks are owned by Special Metals Corporation.)

A key function of the support 12 is to provide mechanical integrity to the membrane structure 10. Hence the thickness of the support 12 depends on the mechanical loads imposed thereon, which are generally dominated by flow induced vibration due to the turbulent flow of molten salt. The skilled artisan will recognize that standard, well-known mechanical strength and support guidelines for tube performance can be applied to the support 12. A wide range of thicknesses and porosities can be used with the general understanding that as porosity decreases, the overall surface of the support 12 must be increased; for example, a support tube would have to be of greater length and/or diameter, or multiple tubes could be employed. Moreover, as porosity of the support 12 is increased, mechanical strength thereof decreases. The support 12 can be made thicker to compensate for the lower strength of higher porosity materials. Since gaseous hydrogen (hence, tritium) has very high mobility, the support 12 primarily has an economic (thicker requires more metal) rather than a performance thickness limit. A mean support 12 thickness of about 1-5 mm, typically about 2 mm, is suggested as suitable for some applications.

The porosity of the support 12 must be interconnected to allow tritium to be rapidly transported therethrough from one surface to the other as indicated by arrow C. Minimum pore size is dependent on achievable manufacturing tolerances. Porous metal supports are generally manufactured as sintered powder structures. The size and shape of powder material used in the fabrication process determines the pore size. A mean powder size in a range of 0.2-5 μm, typically about 0.5 μm is suggested as suitable for some applications, but the key requirement is to have interconnected porosity; tritium gas will be transported readily through a support 12 comprised of any interconnected pore size.

The barrier layer 14 is adherently deposited on the surface of the support 12 that will face the molten salt 18. The barrier layer 14 serves a plurality of important functions while allowing tritium to pass freely therethrough. A first function is to mitigate the generally large, rough porosity of the support 12 in order to provide a suitably smooth, adherent substrate for subsequent deposition of an essentially defect-free separative layer 16.

At the high temperatures characteristic of molten salts, inter-diffusion of support 12 and separative layer 16 materials can perniciously degrade permeation of hydrogen through palladium alloys. Hence, a second function of the barrier layer 14 is to mitigate deleterious metal inter-diffusion between the support 12 and the separative layer 16. Sol-gel derived mesoporous yttria stabilized zirconia (YSZ) has been shown to be an effective barrier to the diffusion of metallic atoms from the support 12 to the separative layer 16. Other suitable barrier layer 14 materials include, but are not limited to scandia stabilized zirconia, alumina, titania, chromia, chromium nitrides, and the like. The particular material selected will depend on the maximum operating temperature and desired lifetime of the component; YSZ is known to have the highest demonstrated temperature performance.

The barrier layer 14 can be made by a sol-gel process wherein nanoscale particles are formed in the solvent. The particles aggregate during the gelation and fuse together due to calcining providing small uniform scale pores. Calcination at higher temperatures will result in smaller pore size. The minimum thickness that is deposited in each dip-dry cycle of sol deposition—gelation is generally about 0.5 μm.

A mean barrier layer 14 thickness of about 3-20 μm, typically about 5-10 μm, is suggested as suitable for some applications. Average pore size of the barrier layer 14 should be no more than 30 nm to prevent structural atoms from diffusing therethrough. Thicker layers should be used with higher temperature operation to adequately limit metal atom diffusion. Minimum thickness of the barrier layer 14 is limited by the requirement for suitably smooth, adherent substrate for subsequent deposition of an essentially defect-free separative layer 16. Maximum barrier layer 14 thickness is limited by corresponding decrease in gas permeability.

The separative layer 16 is deposited on the barrier layer 14 by any suitable conventional means such as, for example, an electroless deposition process. The separative layer 16 can be comprised of palladium or palladium alloy such as, for example, a palladium-silver alloy such as for example, those described by Jayaraman, V. and Lin, Y. S. in *Synthesis and hydrogen permeation properties of ultrathin palladium-silver alloy membranes*. J. Membr. Sci. 1995, 104, 241. Other palladium-bearing alloys can include Pd—Cu.

Average thickness of the separative layer 16 should be in the range of about 10 to about 50 μm. A separative layer 16 that is thinner than 10 μm may lack sufficient structural integrity for the intended application. Moreover, a separative layer 16 that is too thick may not transport tritium with sufficiently desirable efficiency.

Turbulent molten salt 18 flows as shown by arrow A across and contacts the surface of the membrane structure 10 so that essentially all of the tritium within the flowing salt 18 rapidly impinges upon the palladium-bearing separative layer 16. The membrane structure 10 rapidly strips tritium from flowing molten salt 18. The tritium is transported as shown by arrow C through the layers of the membrane structure 10 and into the inert sweep gas 20 from which it can be readily extracted and isolated for utilization. Sweep gas 20 is shown by arrow B as flowing in the same direction as the molten salt 18 but they can flow in different directions. The sweep gas 20 is generally at thermal equilibrium with the molten salt 18 and does not transfer significant heat therefrom.

Figure 2:
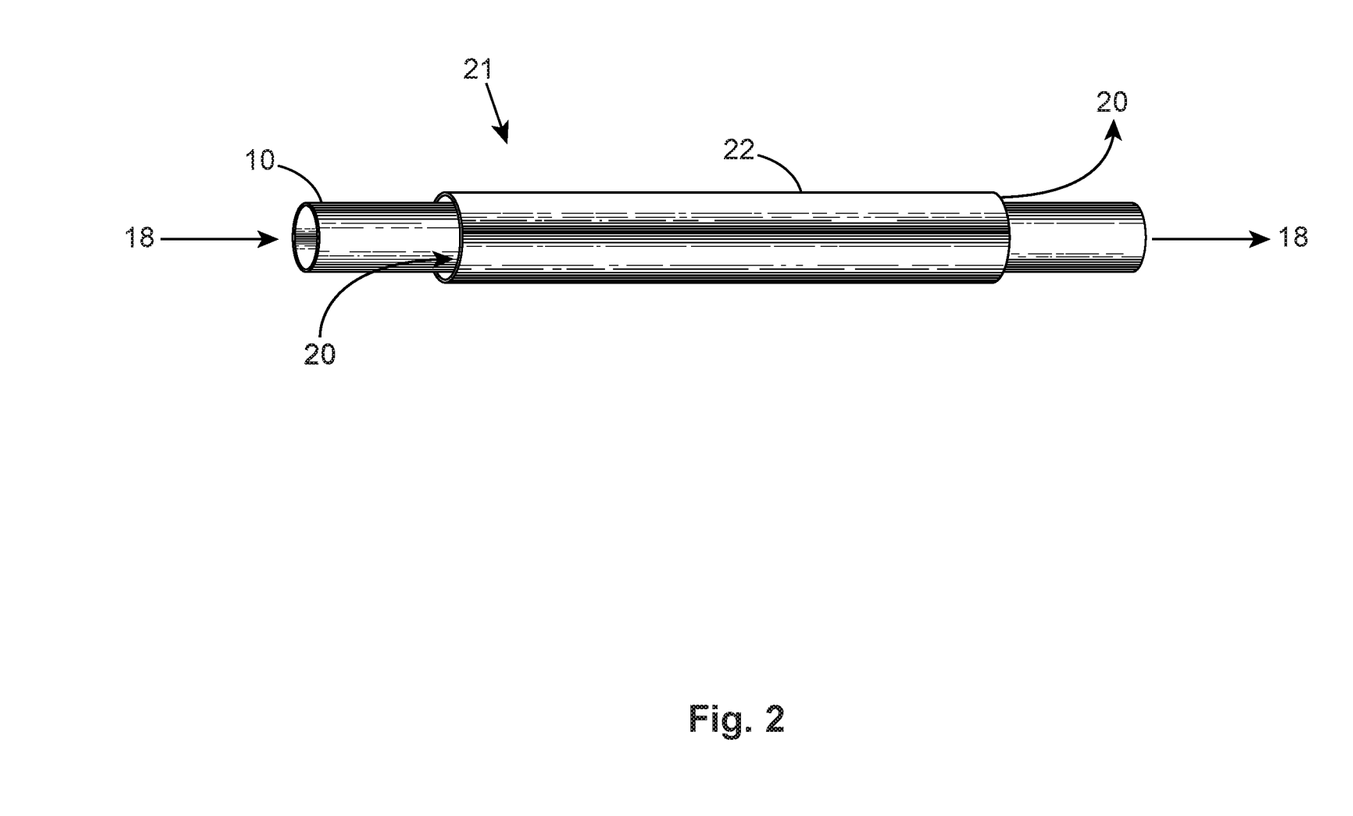
FIG. 2 is a schematic side view showing a single-tube tritium-stripping system in accordance with the present invention.

Referring to FIG. 2, an example of a single-tube tritium-stripping system 21 comprises an inner, tubular membrane structure 10 disposed within an outer containment structure 22 that may be tubular as shown, but can be any suitable shape and configuration. Arrows show typical flows of molten salt 18 and sweep gas 20, but other flow directions may be used.

Figure 3:
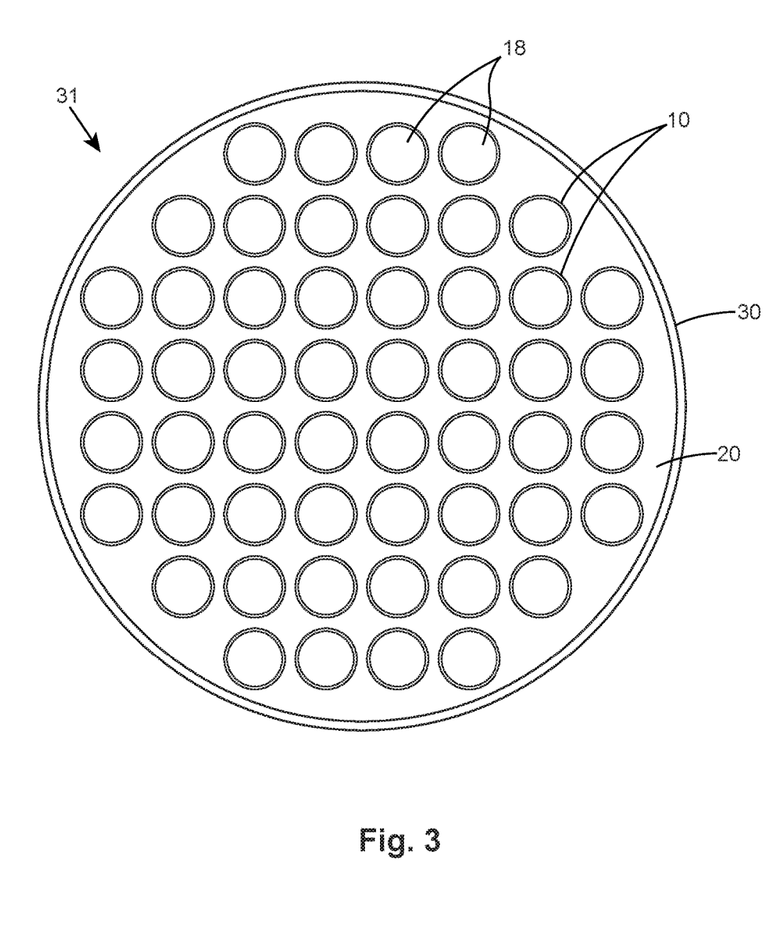
FIG. 3 is a schematic end view showing a multiple-tube tritium-stripping system in accordance with the present invention.

Referring to FIG. 3, an example of a multiple-tube tritium-stripping system 31 comprises a plurality of inner, tubular membrane structures 10 disposed within a single outer containment structure 30 that may be tubular as shown, but can be any suitable shape and configuration. Molten salt 18 flows through the tubular membrane structures 10 and sweep gas 20 flows outside the tubular membrane structures 10 and within the outer containment structure 30.

Figure 4:
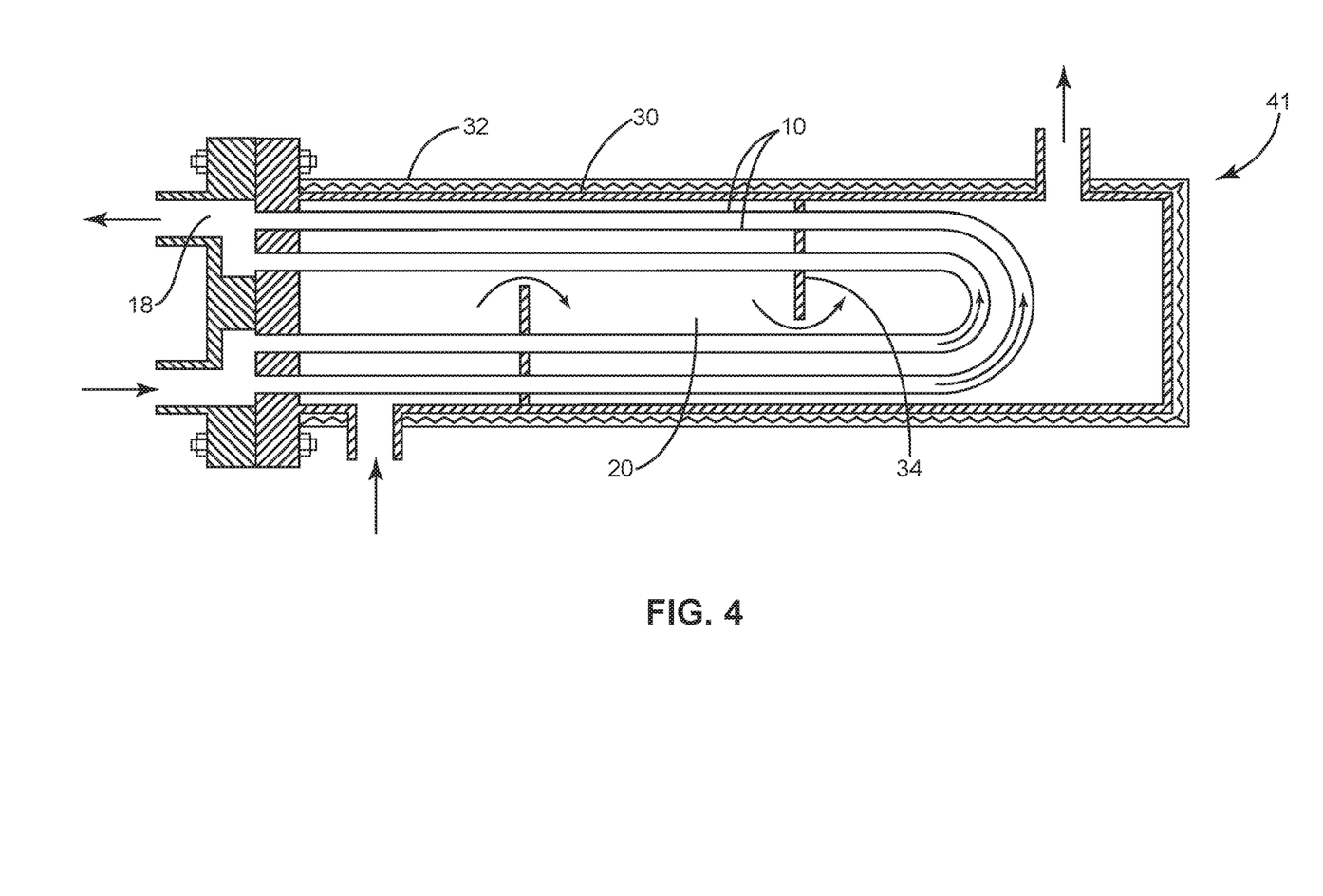
FIG. 4 is a schematic sectional side view showing a multiple-tube tritium-stripping system in accordance with the present invention.

Referring to FIG. 4, an example of a multiple-tube tritium-stripping system 41 comprises a plurality of inner, tubular membrane structures 10 disposed within a single outer containment structure 30 that may be tubular, but can be any suitable shape and configuration. A heating jacket 32 can be employed in order to maintain the salt 18 in a molten state. Baffles 34 are optional, as well as U-shaped membrane structures 10, which can be straight, coiled, or any other suitable shape and configuration. Arrows show typical flows of molten salt 18 and sweep gas 20, but other flow directions may be used.

Means for promoting turbulence (not shown in the figs.) can be employed anywhere within the flow-path of the molten salt 18, including the membrane structure 10 itself. Such means can include active or passive vanes, blades, slats, tubes, baffles, fins, rods, jets, venturi, ports, diverters, contours, corrugations, and the like, and any combination of the foregoing. An example of a turbulence promoter can be found in U.S. Pat. No. 3,302,701 issued on Feb. 7, 1967 to David G. Thomas, entitled "Turbulence Promoter for Increased Heat and Mass Transfer."

Example

Figure 5:
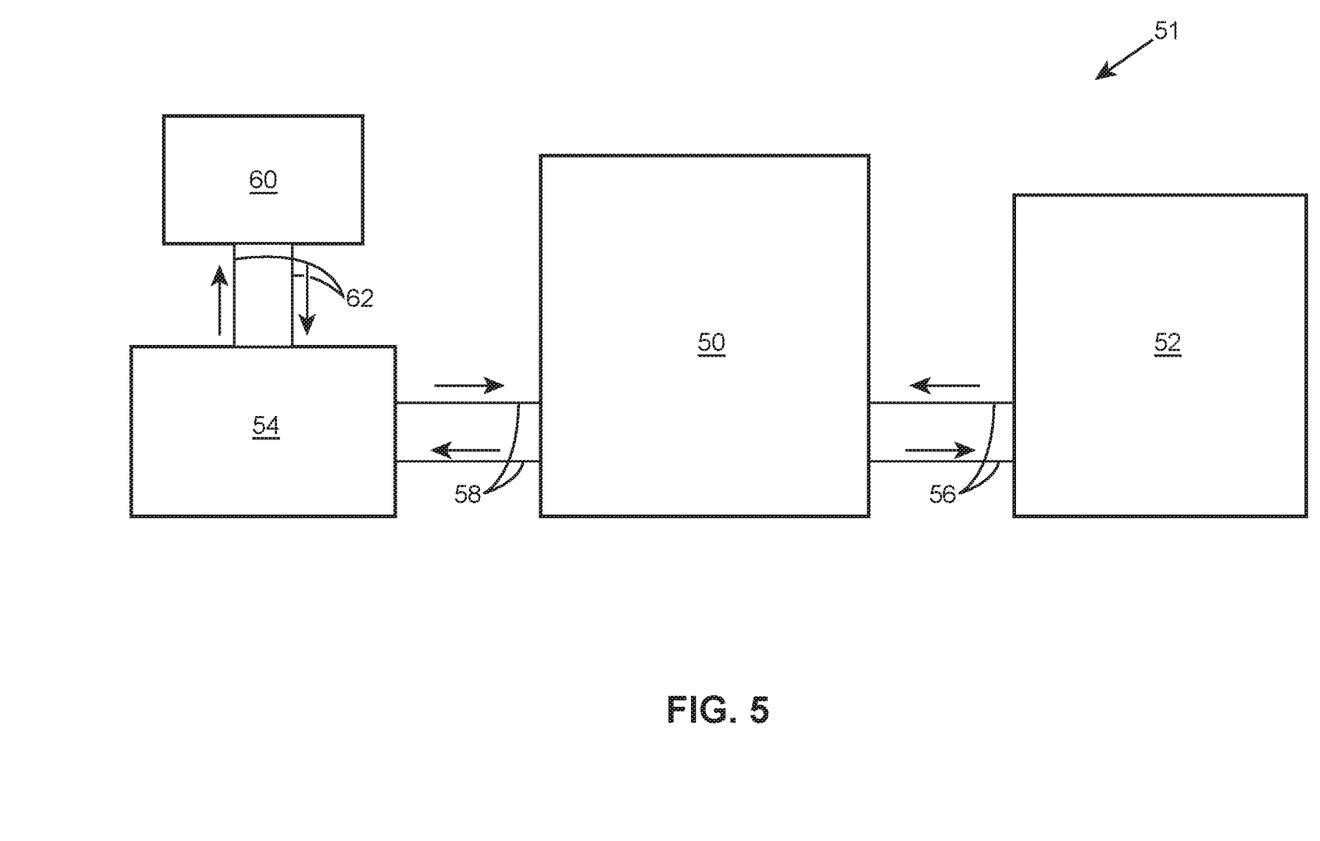
FIG. 5 is a schematic diagram of a nuclear reactor facility having a tritium-stripping system in accordance with the present invention.

Referring to FIG. 5, a nuclear reactor facility 51 includes a reactor 50 and a utilization means 52 which can be an electricity generation plant or any other means for utilizing heat energy generated by the nuclear reactor. The skilled artisan will recognize that FIG. 5 is a very simple, general illustration intended to be applicable to various nuclear systems that are very complicated. Only the most basic components are described in order to illustrate an example of a general application of the invention.

A circulating molten salt stream 56 transfers the heat energy from the nuclear reactor to the utilization means 52. A circulating molten salt stream 58 passes through a tritium-stripping system 54 where tritium is removed as described hereinabove. A sweep gas system 60 circulates a sweep gas stream 62 into and out of the tritium-stripping system 54. Two circulating molten salt streams 56, 58 are shown but a single circulating molten salt stream can be used.

While there has been shown and described what are at present considered to be examples of the invention, it will be obvious to those skilled in the art that various changes and modifications can be prepared therein without departing from the scope of the inventions defined by the appended claims.

What is claimed is:

1. A tritium-stripping apparatus in a nuclear reactor system including a nuclear reactor, a utilization means for utilizing heat energy generated by the nuclear reactor, and a flowing stream of molten salt for transferring the heat energy from the nuclear reactor to the utilization means, the tritium-stripping apparatus comprising:
   an outer containment structure;
   a tritium-separating membrane structure within the outer containment structure, the tritium-separating membrane structure including:
      a porous support selected from a group consisting of stainless steel and nickel-based alloy, and defining a first surface of the tritium-separating membrane structure;
      a nanoporous structural metal-ion diffusion barrier layer supported by and in contact with the porous support; and
      a gas-tight nonporous palladium-bearing separative layer supported by and in contact with the nanoporous structural metal-ion diffusion barrier layer, and defining a second surface of the tritium-separating membrane structure; and
   a sweep gas circulating between the outer containment structure and the first surface of the tritium-separating membrane structure;
   wherein the tritium-separating membrane structure is configured to receive the flowing stream of molten salt in contact with the gas-tight nonporous palladium-bearing separative layer so that tritium contained within the molten salt is absorbed by the gas-tight nonporous palladium-bearing separative layer and transported through the first surface and wherein the sweep gas circulates in contact with the porous support for collecting the transported tritium, and wherein the tritium-separating membrane structure is tubular and the first surface of the tritium-separating membrane structure is an outer surface of the tube and the second surface of the tritium-separating membrane structure is an inner surface of the tube.

2. The tritium-stripping apparatus in accordance with claim 1 wherein said porous support comprises 316 stainless steel.

3. The tritium-stripping apparatus in accordance with claim 1 wherein said structural metal-ion diffusion barrier layer comprises at least one material selected from the group consisting of yttrium-stabilized zirconia, scandia-stabilized zirconia, alumina, titania, chromia, and chromium nitride.

4. The tritium-stripping apparatus in accordance with claim 1 wherein said gas-tight nonporous palladium-bearing separative layer comprises a palladium alloy.

5. The tritium-stripping apparatus in accordance with claim 4 wherein said palladium alloy comprises a palladium-silver alloy.

6. The tritium-stripping apparatus in accordance with claim 1 wherein the outer containment structure is a tubular containment structure, wherein the sweep gas circulates between the tubular containment structure and the outer surface of the tubular tritium-separating membrane structure.

7. The tritium-stripping apparatus in accordance with claim 6 wherein the tubular tritium-stripping membrane structure is one of a plurality of tubular tritium-separating membrane structures within the tubular containment structure.

8. The tritium-stripping apparatus in accordance with claim 1 wherein the tritium-stripping system comprises a plurality of tubular tritium-separating membrane structures within the outer containment structure.

9. The tritium-stripping apparatus in accordance with claim 8 wherein the plurality of tritium-separating tubular membrane structures are U-shaped, and wherein the sweep gas circulates around the outer surface of the U-shaped tubular tritium-separating membrane.

\* \* \* \* \*